Dec. 27, 1949 G. D. WILLITS 2,492,775
BEARING ASSEMBLY
Filed Feb. 28, 1947
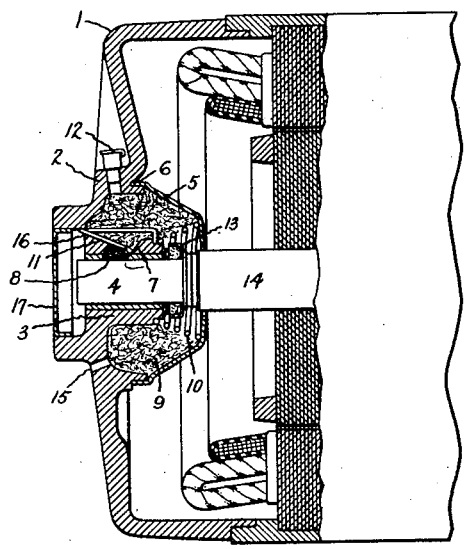
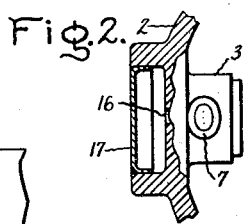
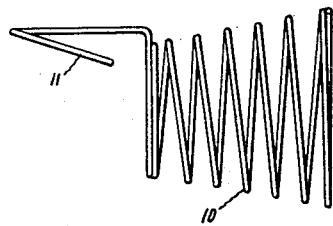
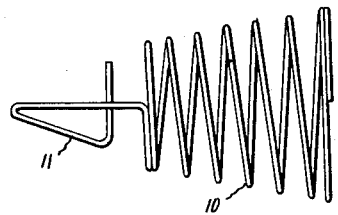
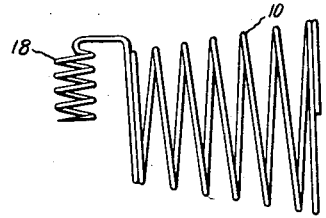
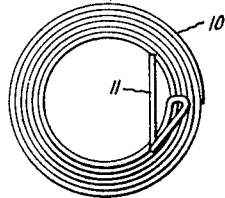
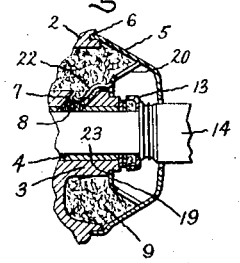
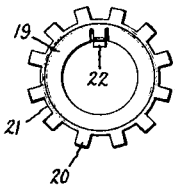
Inventor:
Glenn D. Willits.
by Rowell P. Mack
His Attorney.

Patented Dec. 27, 1949

2,492,775

UNITED STATES PATENT OFFICE 2,492,775

BEARING ASSEMBLY

Glenn D. Willits, Leo, Ind., assignor to General Electric Company, a corporation of New York Application February 28, 1947, Serial No. 731,614

12 Claims. (Cl. 308—132)

1

This invention relates to bearing assemblies for rotating apparatus in which packing material is utilized to transfer the lubricant to the bearing surface.

The invention is particularly concerned with a bearing construction in which lubrication is accomplished through a body of capillary material having a part positioned to receive lubricant flung from a rotating shaft and a further part held in contact with the journal surface of the shaft for feeding lubricant thereto.

It is an object of the invention to provide a structurally simplified assembly of this character wherein a single element serves both to restrain capillary material from contact with the shaft in the region where this is desired and to urge such material into shaft contact at the place where this is desired.

Further objects and advantages of my invention will become apparent and my invention will be better understood from the following description referring to the accompanying drawing, and the features of novelty which characterize my invention will be pointed out with particularity in the claims annexed to and forming a part of this specification.

In the drawing, Fig. 1 is a sectional view of one embodiment of this improved bearing construction illustrating the assembly of the various component parts on a dynamo-electric machine; Fig. 2 is a vertical view, partly in section, of the embodiment of Fig. 1; Figs. 3, 4 and 5 are different views of a helical spring used in the construction of the bearing of Fig. 1; Fig. 6 illustrates another form of helical spring used in this improved bearing construction; and Figs. 7 and 8 illustrate a further embodiment of this invention.

Referring now to Figs. 1 and 2, there is shown an end shield 1 of a dynamoelectric machine having a bearing construction embodying this invention. The bearing housing is formed by an outwardly flaring wall 2 formed on the end shield 1 and a reentrant or bearing support wall 3 formed integral with and extending inwardly from the outer wall 2. Sleeve bearing 4 is positioned in and supported by reentrant wall 3 and rotatably seats shaft 14. Plate 5 which is flared in the opposite direction from the outer wall 2 and is apertured to receive shaft 14, is suitably seated in annular groove 6 in the inner surface of outer wall 2 with its aperture spaced axially from the end of bearing 4. Plate 5 when in position forms a closure for the recess formed by outer wall 2 and reentrant wall 3 thus providing a lubricant reservoir at the lower portion of the recess.

2

In order to feed lubricant from the reservoir to the bearing surface, capillary means is provided which completely fills the recess and surrounds the bearing and the shaft at the end of the bearing. In the embodiment shown, the capillary means is composed of oil wick 8 of material such as felt and absorbent packing material 9 which may be waste or other suitable material. The upper surfaces of reentrant wall 3 and bearing 4 are provided with a lateral groove or opening 7 in which oil wick 8 is positioned. The middle portion of the oil wick is in contact with the journal surface of shaft 14 and serves to feed lubricant thereto, the ends being placed in the recess at random. Absorbent material 9 completely fills the recess and surrounds the bearing and the shaft at the end of the bearing, serving to feed lubricant from the reservoir to the oil wick 8.

It can be readily understood that the lubricant which is fed to the bearing surface by the oil wick will flow out of the ends of the bearing and it is therefore necessary to provide some means for returning the lubricant to the packing material 9 to be refed to the bearing. Means must also be provided to keep the packing material 9 which surrounds the shaft 14 at the end of bearing 4 away from the shaft. To secure these features, the arrangement now to be described is provided. Helical spring 10 is positioned around shaft 14, one end of its compression portion being seated against the inner end of bearing 4 and reentrant wall 3 and the other end being positioned against the flaring portion of plate 5. In this embodiment, the spring is positioned with the smaller portion of the helix against the bearing and the larger portion against the plate 5. The compression portion of spring 10 retains the absorbent material 9 away from contact with shaft 14. Lubricant that flows out of the inner end of bearing 4 and along shaft 14 is picked up by oil thrower 13 on shaft 14 and thrown centrifugally through the clearance between the turns of shaft 10 back into the absorbent material 9. Thus, all the lubricant which flows out of the inner end of bearing 4 and along the shaft will be thrown centrifugally between the turns of spring 10 back into the absorbent packing.

Formed integral with spring 10 is a projection or lip 11 which is used to press oil wick 8 against the journal surface of shaft 14. Referring now to Figs. 3, 4 and 5, it will be seen that spring 10 is basically a helical spring with its smaller end sufficiently large to encompass shaft 14. This spring is formed of suitable material such as iron wire and before insertion between the bearing and end plate, is unstressed and exceeds in length the axial distance between these two elements. The spring is compressed slightly on assembly; however, enough space is left between the turns through which the lubricant can pass when thrown centrifugally by the oil thrower 13. At the smaller end of spring 10, the spring wire is formed into a projection or extension 11 extending axially from the smaller end of the main spring body and in a plane with its axial dimension, but offset from the central axis. In this embodiment, this projection is formed in the shape of a figure "4," the part corresponding to the vertical section of the "4" being a continuation of the spring wire and the slanting component of the "4" being bent away from the vertical section toward the central axis so as to secure a vertical spring pressure acting through the crossbar of the "4" to force oil wick 8 against the journal surface of shaft 14. In this embodiment the outermost tip of the projection 11, corresponding to the peak of the figure "4" projects slightly into and is held in place by one of the plurality of cast oil return holes 16 which subsequently will be more completely described.

While the projection shown in Figs. 3, 4 and 5 is in the shape of a figure "4," it is to be understood that any other configuration can be employed which will secure adequate vertical spring pressure to apply to oil wick 8. Such a modified form is shown in Fig. 6 in which the spring wire projection at the smaller end of the main helical spring 10 is formed in the shape of a coil spring 18 with its axis perpendicular to the main axis of the main helical spring 10. It will readily be seen that the coil spring portion 18 will apply the same vertical pressure on oil wick 8 that is applied by the figure "4" projection of Figs. 3, 4 and 5.

It will be noted that a certain portion of the lubricant applied to the bearing surface by oil wick 8 will flow in the opposite direction from the oil thrower 13 toward the outer end of shaft 14. End cap 17 is provided to close the outer opening of outer wall 2 and to provide an auxiliary chamber with the reentrant wall 3 in which any lubricant thrown from the end of shaft 14 is collected. The lubricant so collected is drained off into the absorbent material and the lubricant reservoir through the above referred to cast oil return holes 16, a plurality of which are provided around the outer periphery of the reentrant wall 3 at the juncture of the reentrant wall and the outer wall 2. Thus, the lubricant will be drained from the auxiliary chamber regardless of the position in which the motor is mounted. The absorbent material and the lubricant reservoir is filled through an oil cup 12 secured in a drilled hole in outer wall 2. A plurality of oil overflow holes 15 are provided to allow any excess lubricant accumulated in the reservoir to drain off rather than to allow it to overflow through the aperture in end plate 5 into the motor.

Referring now to Figs. 7 and 8, there is shown another embodiment of this invention in which the entire packing retaining and wick holding assembly is punched and formed from sheet material. Here, a spider is formed with a hub portion 19, resilient spring fingers 20, and a projection or wick hold-down portion 22. After punching, the spider is formed and positioned on the reentrant bearing wall 3, as shown in Fig. 7, with the projection 22 bent outwardly so as to apply a vertical spring pressure on oil wick 8 and the fingers 20 bent in the opposite direction to form the retaining portion for packing material 9.

The fingers 20 are initially bent sufficiently to permit their being deflected slightly when end cap 5 is inserted in grooves 6 in outer wall 2 thus holding the spider assembly tightly between shoulder 23 of reentrant wall 3 and the end cap 5. It can readily be seen that the slots 21 between the fingers 20 permit the lubricant to be thrown centrifugally into the packing material 9 by oil thrower 13 while the fingers themselves retain the packing material away from the shaft in a similar manner to the helical spring 10 of Fig. 1.

To summarize, it will now be readily understood that the lubricant in the lubricant reservoir is absorbed by packing material 9 and fed through oil wick 8 to the journal surface of shaft 14. Any lubricant which is carried along the shaft is picked up and thrown centrifugally by oil thrower 13 through the coils of spring 10 in the embodiment shown in Fig. 1, or the slots 21 between fingers 20 in the embodiment of Fig. 7, back into packing material 9. An extension of spring 10, or the formed projection of the spider of Fig. 7, is utilized to maintain the oil wick in contact with the journal surface of the shaft and thus the spring or spider unit performs the dual functions of retaining the capillary material away from the shaft and in contact with the bearing surface. Any lubricant which flows out of the end of the bearing at the end of the shaft accumulates in the auxiliary chamber formed by the end cap 17 and is drained back into the packing and lubricant reservoir through the oil return holes 16.

An advantage of this bearing construction is the fact that the entire unit can be assembled prior to the insertion of the shaft and conversely, the shaft can be removed without the packing being forced into the opening of the bearing. The rolling action of the oil wick 8 when assembling the shaft in the bearing prevents any shearing action which is encountered when the usual packing material is provided to directly lubricate the shaft. It is also possible to ascertain by visual inspection prior to the assembly of the shaft whether the oil wick is properly positioned to contact the shaft.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A bearing construction including a sleeve bearing, a shaft rotatably seated in said bearing, capillary means surrounding said bearing and the shaft at the end of said bearing for feeding lubricant directly to said bearing, and resilient means extending axially from said bearing and surrounding said shaft for retaining said capillary means away from said shaft, a portion of said resilient means resiliently urging a part of said capillary means in contact with said bearing.

2. A bearing construction including a sleeve bearing, a shaft rotatably seated in said bearing, lubricant feeding means for feeding lubricant directly to the journal surface of said shaft, absorbing means surrounding said bearing and the shaft at the end of said bearing for feeding lubricant to said lubricant feeding means, and resilient means extending axially from said bearing and surrounding said shaft for retaining said absorbing means away from said shaft, a portion of said resilient means resiliently urging said lubricant feeding means in contact with said journal surface.

3. In combination with a rotatable shaft, a sleeve bearing, capillary means surrounding said bearing and the shaft at the end of said bearing for feeding lubricant directly to said bearing, said capillary means being adapted to receive lubricant thrown centrifugally by said shaft, and resilient means surrounding said shaft and adjacent said bearing for retaining said capillary means away from said shaft, said resilient means having a projection formed integral therewith for holding a part of said capillary means in contact with said bearing.

4. In combination with a rotatable shaft, a sleeve bearing, capillary means surrounding said bearing and the shaft at the end of said bearing for feeding lubricant directly to said bearing, said capillary means being adapted to receive lubricant thrown centrifugally by said shaft, and resilient means surrounding said shaft and adjacent said bearing for retaining said capillary means away from said shaft, said resilient means having a projection formed integral therewith for holding a part of said capillary means in contact with said bearing, said shaft having means for throwing lubricant centrifugally.

5. A hollow end shield for dynamoelectric machines or the like having a flaring outer wall, a bearing attached to said wall and extending axially outward therefrom, a plate spaced from said bearing and arranged to provide a closure for the recess formed by said bearing and said outer wall, means including capillary material arranged in said recess for feeding lubricant to said bearing, and resilient means positioned between said bearing and said plate for retaining said capillary material in said recess, a portion of said resilient means resiliently urging a part of said capillary material in contact with said bearing.

6. In a bearing construction, the combination of a flaring outer wall, a bearing support formed on said wall, a bearing mounted on said bearing support and extending axially outwardly from said wall, a shaft rotatably seated in said bearing, lubricant feeding means for feeding lubricant directly to the journal surface of said shaft, a flaring plate in spaced relationship with said bearing and apertured to receive said shaft for providing a closure for the recess formed by said bearing support and said outer wall, means including absorbent material arranged in said recess and surrounding said bearing and said shaft at the end of said bearing for feeding lubricant to said lubricant feeding means, said absorbent material being adapted to receive lubricant thrown centrifugally from said shaft, and resilient means positioned between said bearing and said plate and surrounding said shaft for retaining said absorbent material away from said shaft, said resilient means having a projection formed integral therewith for resiliently urging said lubricant feeding means into contact with said journal surface, said shaft having means to throw lubricant centrifugally.

7. A bearing construction for dynamoelectric machines including a sleeve bearing, a shaft rotatably seated in said bearing, said bearing having an opening formed in its surface, a lubricating oil wick arranged in said bearing opening and in contact with said shaft for feeding lubricant directly to the journal surface of said shaft, means including absorbent material arranged about said bearing for feeding lubricant to said oil wick, and resilient means for retaining said absorbent material about said bearing, said resilient means having a portion for holding said oil wick in contact with said journal surface of said shaft.

8. A bearing construction including a sleeve bearing, a shaft rotatably seated in said bearing, capillary means surrounding said bearing and the shaft at the end of said bearing for feeding lubricant directly to said bearing, and a helical spring member surrounding said shaft at the end of said bearing for retaining said capillary means away from said shaft, said spring having a projection formed integral therewith extending axially from the bearing end of said spring and having resilience in a direction transverse to the major axis of the spring, said projection being adapted to press transversely upon a portion of said capillary means which is exposed to and in contact with a journal surface of said shaft whereby said portion of said capillary means is maintained in contact with said journal surface.

9. A bearing construction comprising a sleeve bearing, a shaft rotatably seated in said bearing, capillary means surrounding said bearing and the shaft at the end of said bearing for feeding lubricant directly to said bearing, and a helical spring member surrounding said shaft at the end of said bearing for retaining said capillary means away from said shaft, said spring having a projection formed integral therewith extending axially from the bearing end of said spring, said projection including a part which serves as a pressure applying member and a second part which serves resiliently to impel said pressure applying member in a direction transverse to the major axis of said spring, said first named part of said projection being adapted to press transversely upon a portion of said capillary means which is exposed to and in contact with a journal surface of said shaft whereby said portion of said capillary means is maintained in contact with said journal surface.

10. A bearing construction comprising a sleeve bearing, a shaft rotatably seated in said bearing, capillary means surrounding said bearing and the shaft at the end of said bearing for feeding lubricant directly to said bearing, said capillary means being adapted to receive lubricant thrown centrifugally from said shaft, a helical spring member surrounding said shaft at the end of said bearing for retaining said capillary means away from said shaft, said helical spring being adapted to allow lubricant thrown centrifugally from said shaft to pass through its turns to said capillary means, said helical spring having a projection formed integral therewith for resiliently urging a part of said capillary means into contact with said bearing, and means on said shaft to throw lubricant centrifugally.

11. A bearing assembly for a rotating machine comprising an end shield for the machine, a bearing extending inwardly from the end shield, a housing structure having a central portion spaced from the inner end of said bearing and an outer portion enclosing the space surrounding the bearing, a shaft extending through said bearing and said housing structure, capillary material in said space for feeding lubricant to the journal surface of said shaft through an opening in said bearing, and a unitary punched metal member extending around said shaft in the region between said housing member and the end of said journal for holding the capillary material out of contact with the shaft in said region, said member including circumferentially spaced fingers extending axially toward said housing to allow outward passage to said capillary material of lubricant flung from said shaft and further including a resilient projection formed integrally therewith for urging a portion of said capillary material into contact with the journal surface of said shaft through the said bearing opening.

12. A bearing assembly for a rotating machine comprising an end shield for the machine, a bearing extending inwardly from the end shield, a housing structure having a central portion spaced from the inner end of said bearing and an outer portion enclosing the space surrounding the bearing, a shaft extending through said bearing and said housing structure, capillary material in said space for feeding lubricant to the journal surface of said shaft through an opening in said bearing, and a member extending around said shaft in the region between said housing member and the end of said journal for holding the capillary material clear of the shaft in said region, said member being of perforate structure to allow outward passage to said capillary material of lubricant flung from said shaft and including a resilient portion formed integral therewith for urging a portion of said capillary material into contact with said shaft through the journal opening.

GLENN D. WILLITS.

REFERENCES CITED

The following references are of record in the file of this patent:

UNITED STATES PATENTS

| Number | Name | Date |
|---|---|---|
| 2,053,425 | Else | Sept. 8, 1936 |
| 2,078,783 | Welch | Apr. 27, 1937 |